US012710816B2

(12) United States Patent
Qin et al.

(10) Patent No.: US 12,710,816 B2
(45) Date of Patent: Aug. 18, 2026

(54) CAMERA FIELD OF VIEW CAPTURING EYE REFLECTION AND EYE VIEWS FOR GAZE TRACKING

(71) Applicant: Apple Inc., Cupertino, CA (US)

(72) Inventors: Hao Qin, Saratoga, CA (US); Hua Gao, San Jose, CA (US); Oliver G Wenisch, Potsdam (DE); Tom Sengelaub, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/217,700

(22) Filed: May 23, 2025

(65) Prior Publication Data

US 2025/0377721 A1 Dec. 11, 2025

Related U.S. Application Data

(60) Provisional application No. 63/657,661, filed on Jun. 7, 2024.

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01); *G02B 27/0179* (2013.01); *G02B 2027/0123* (2013.01); *G02B 2027/0138* (2013.01); *G02B 2027/0178* (2013.01); *G02B 2027/0187* (2013.01)

(58) Field of Classification Search
CPC . G06F 3/013; G02B 27/0172; G02B 27/0179; G02B 2027/0123; G02B 2027/0138; G02B 2027/0178; G02B 2027/0187; G02B 27/0093; G02B 27/017
See application file for complete search history.

(56) References Cited

U.S. PATENT DOCUMENTS

| | | | | |
|---|---|---|---|---|
| 9,791,924 | B2 | 10/2017 | Shiu et al. | |
| 10,698,204 | B1 | 6/2020 | Ouderkirk et al. | |
| 10,725,302 | B1 | 7/2020 | Sharma et al. | |
| 11,073,903 | B1 * | 7/2021 | Ouderkirk | G06F 3/013 |
| 11,237,628 | B1 * | 2/2022 | Sharma | G02B 27/1086 |
| 11,326,763 | B1 * | 5/2022 | Molner | F21V 9/14 |

(Continued)

FOREIGN PATENT DOCUMENTS

| | | | | |
|---|---|---|---|---|
| CN | 112346558 A * | 2/2021 | G02B 27/0172 |
| KR | 20170003442 A * | 1/2017 | G02B 27/0172 |
| WO | 2022261205 A1 | 12/2022 | |

OTHER PUBLICATIONS

English Translation KR 20170003442 A, Jan. 9, 2017.*

(Continued)

*Primary Examiner* — Ricardo Osorio
(74) *Attorney, Agent, or Firm* — S. Scott Foster; Kowert, Hood, Munyon, Rankin & Goetzel, P.C.

(57) ABSTRACT

Systems and apparatus may implement a camera field of view capturing eye reflection and eye views for gaze tracking. A light source may emit light that reaches the surface of an eye. A camera may be implemented with a field of view that includes a portion of a surface of the eye and a portion of a reflective surface of a lens that includes a reflection of the eye. A controller may cause the camera to capture images of the eye and reflection of the eye while the light source emits light.

20 Claims, 6 Drawing Sheets

(56) References Cited

U.S. PATENT DOCUMENTS

| | | | | |
|---|---|---|---|---|
| 11,846,797 | B2 | 12/2023 | Gollier et al. | |
| 2004/0227703 | A1* | 11/2004 | Lamvik | G09G 3/3233 348/E5.145 |
| 2013/0114850 | A1* | 5/2013 | Publicover | A61B 3/0025 382/103 |
| 2015/0169050 | A1* | 6/2015 | Publicover | G06T 7/74 345/156 |
| 2015/0220779 | A1* | 8/2015 | Publicover | G06F 3/013 348/78 |
| 2019/0235248 | A1* | 8/2019 | Ollila | G02B 27/0093 |
| 2019/0354175 | A1* | 11/2019 | Torkos | G06F 3/013 |
| 2020/0326777 | A1* | 10/2020 | Shoushtari | G02B 27/0093 |
| 2023/0119935 | A1* | 4/2023 | Sztuk | G02B 27/0172 345/8 |

OTHER PUBLICATIONS

English Translation CN 112346558 A, Feb. 9, 2021.*

International Search Report and Written Opinion from PCT Patent Application No. PCT/US2025/0321358, dated Oct. 21, 2025, pp. 1-13.

* cited by examiner lens reflection configuration 112
light sources 130
eye 100
capture reflection of eye 144
capture eye 142
camera 140
eye in image 152
eye reflection in image 154
controller 150
composite view of glints 160 eye reflection 302 not occluded 324 curved reflective lens 310 camera 300 field of view 320 occluded 322 eye 100

FIG. 3

CAMERA FIELD OF VIEW CAPTURING EYE REFLECTION AND EYE VIEWS FOR GAZE TRACKING

RELATED APPLICATIONS

This application claims benefit of priority to U.S. Provisional Application Ser. No. 63/657,661, entitled "CAMERA FIELD OF VIEW CAPTURING EYE REFLECTION AND EYE VIEWS FOR GAZE TRACKING," filed Jun. 7, 2024, and which is incorporated herein by reference in its entirety.

BACKGROUND

Gaze tracking is the process of monitoring an eye to determine the direction of the eye's vision, also called gaze. The location of the pupil can provide an approximate gaze tracking. Purkinje images, also called glints, can provide a means for a gaze tracking system to track movement of the pupil.

SUMMARY

A system, device, or apparatus may implement a camera field of view capturing eye reflection and eye views for gaze tracking. A light source may emit light that reaches the surface of an eye. A camera may be implemented with a field of view that includes a portion of a surface of the eye and a portion of a reflective surface of a lens that includes a reflection of the eye. A controller may cause the camera to capture images of the eye and reflection of the eye while the light source emits light. The light source may emit infrared light and the reflective surface may be a hot mirror. The lens may be implemented in different shapes including flat and curved shapes. Various different gaze tracking techniques, including eye enrollment techniques, may use images captured by the camera.

BRIEF DESCRIPTION OF THE DRAWINGS

FIG. 3 illustrates a curved lens for capturing multiple eye views for gaze tracking, according to some embodiments.

Figure 1:
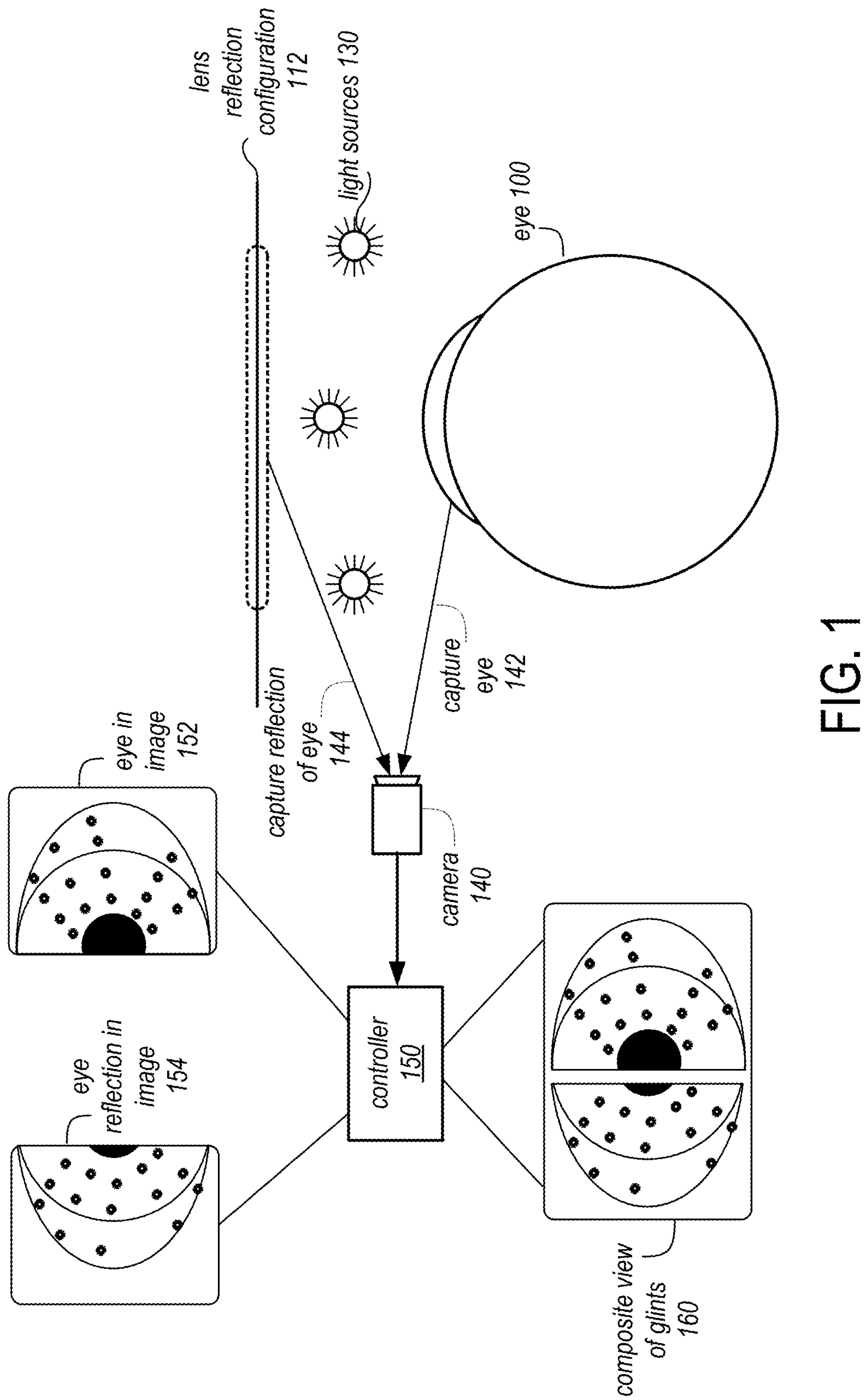
FIG. 1 illustrates a camera field of view capturing eye reflection and eye views for gaze tracking, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

A gaze tracking system can achieve a higher degree of accuracy by obtaining structural data about the eye during an initial enrollment process. The externally observable portions of the eye, such as the iris-pupil boundary, may change position relative to the internal portion of the eye, such as the macula, as the eye undergoes changes in shape, for example, from changing dilation states or moving to a particular pose.

A portion of the process used by the gaze tracking enrollment system may include displaying indicators to indicate to the user where to direct the center of vision of the user's eye. The gaze tracking enrollment system may use illumination configurations with a set amount of light to cause the eye to have a particular dilation state while the gaze tracking enrollment system uses photometric stereo techniques to obtain structure data about the eye with the known direction of vision and known dilation state, including information about the cornea and the iris-pupil boundary of the eye. The gaze tracking enrollment system may change the location of the indicator and the amount of light used in order to obtain additional structure data for use in gaze tracking with the particular eye.

The gaze tracking enrollment system may generate an iris-pupil boundary model with the obtained structure data of the eye. A gaze tracking system, which may include the gaze tracking enrollment system, may use the generated iris-pupil boundary model in later gaze tracking processes to increase the accuracy of gaze tracking. For a gaze tracking system in a device such as a head-mounted display, the display may be close to the eye, and a high degree of accuracy in gaze tracking may be needed to identify the portion of the display to which the center of vision of the eye is directed.

In some embodiments, the gaze tracking enrollment system may be included in a head-mounted display device, for example, a glasses-type head-mounted display device. The gaze tracking enrollment system may use a controllable tint of transparent lenses of the head-mounted display device to limit the amount of uncontrolled ambient light that is present during the enrollment process.

In order to provide a high degree of accuracy, various embodiments of a camera field of view capturing eye reflection and eye views for gaze tracking may be implemented. For example, in some scenarios, such as head-mounted display devices discussed above and below, limited numbers of cameras (e.g., one camera per eye) and/or limited locations of cameras (e.g., on a nose piece) may limit the visibility of the eye such that using light sources emitting light onto an eye to produce reflections of the light sources directly on the eye (e.g., glints), that stable reflections on a cornea may not be created. However, by implementing a camera field of view capturing eye reflection and eye views for gaze tracking, the different views different angles can improve visibility of reflections of the light source for eye tracking techniques, (e.g., improving glint visibility) including the enrollment techniques discussed above and below, as well as other potential gaze tracking techniques. Different lens shapes, as discussed below, can provide different views, providing different options for improving visibility and producing useful patterns for gaze tracking techniques.

FIG. 1 illustrates a camera field of view capturing eye reflection and eye views for gaze tracking, according to some embodiments.

In various embodiments, a light source, such as light sources 130 may be placed, located, or piped into a lens or placed in various locations around an eye 100 (e.g., in a frame). Different numbers and/or locations of light sources 130 may be used to create different patterns of glints or other light emissions that reach eye 100. Camera 140 may have a field of view (e.g., a wide angle field of view, such as viewing angle between 60° and 110°) that captures at least a portion 142 of the surface of eye 100 and a least a portion 144 of a surface of a lens that provides a reflection of eye 100 according to lens reflection configuration 112. In this way, camera 140 may capture in a single image of the surface of eye 100, eye in image 152, and the reflection of the eye, eye reflection in image 154, and provide them to controller 150, which may process or provide the images for processing to perform various techniques, including gaze tracking techniques, using image-based glints, by creating a composite view 160 of glints.

In some embodiments, a lens may be made of various different materials including, but not limited to, glass, plastic (e.g., polycarbonate), or other materials that may be coated, manipulated, or transformed to provide desired light directing properties. In some embodiments, a surface of a lens, depicted as lens reflection configuration 112, may include a fully reflective coating, such that light reflected off of eye 100 may be depicted in the lens's reflective surface. In some embodiments, a fully reflective coating may be of a type that corresponds to the spectrum of light emitted from light sources 130. For example, light sources 130 may be infrared light sources, the lens reflection configuration may include a portion or coating act as a "hot mirror" that reflects light within the infrared portion of the electromagnetic spectrum (or near the infrared portion) while allowing light from other portions of the electromagnetic spectrum (e.g., visible light, ultra-violet light) to pass through.

In various embodiments, light source 130 may include various types of light generation. For example, in some embodiments, light source 130 may be a Light Emitting Diode (LED). In some embodiments, light source 130 may emit light at different ranges of the electromagnetic spectrum. In at least one embodiment, light source 130 may emit invisible light (e.g., light near or within the infrared range of the electromagnetic spectrum). Although one arrangement of light sources is depicted in FIG. 1, multiple light sources could be placed around the eye and/or other features such as a lens.

In various embodiments, camera 140 may be an image sensor with the ability to capture image data of light at specific or across multiple ranges of the electromagnetic spectrum. For example, in at least one embodiment, camera 140 may be able to capture light near or within the infrared range of the electromagnetic spectrum. Camera 140 may have a field of view, such as a wide angle field of view, and orientation with respect to a lens and eye (e.g., according to the camera's placement and orientation within a frame of a head-mounted device or other apparatus that implements a gaze tracking system) that captures multiple views of the surface of eye 100 in a single image according to a directly captured 142 image of eye 100 and via a reflection of eye 100 using the lens reflection configuration 112. In at least some embodiments, camera 140 may implement an anamorphic lens. In at least some embodiments, an anamorphic lens may including additional lens elements to anamorphize light received via the anamorphic lens to increase or provide a wider aspect ratio for camera 140. Note that the position of camera 140 and location of field of view is provided for illustrative purposes and is not intended to be limited as to the different placement or arrangement of camera 140 and/or field of view. For example, an additional camera not depicted may cover a different portion of the surface of eye 100 (e.g., on the opposite side as camera 140) or with a different (e.g., wider or narrower) field of view.

In various embodiments, controller 140 may be an electronic component (e.g., processor, microprocessor, or dedicated circuitry, that is programmed by software or configured by hardware design) to accept image data captured by camera 140. Although not illustrated, in at least some embodiments, camera 140 may control the timing, intensity, or various other properties of light source 130. In this way, controller 150 may coordinate obtaining image data that can be used for perform various gaze tracking techniques. For example, the amount of light that is emitted from the light sources may affect the size of the pupil of eye 100 in relation to the size of the iris of eye 100, which may be referred to as the dilation state of the eye. In another example, as depicted at image-based glints may be captured according to light emitted from light sources 130 that are captured from the surface of the eye may be applicable to determine gaze information. Because controller 150 may receive different views of eye 100, such as eye reflection image 154 and eye image 152, different gaze tracking techniques can make use of information that is captured by a different view of eye 100 that may be obscured in a different view (as discussed below with regard to FIGS. 2 and 3), and, for example, create a composite view of glints 160.

Figure 2:
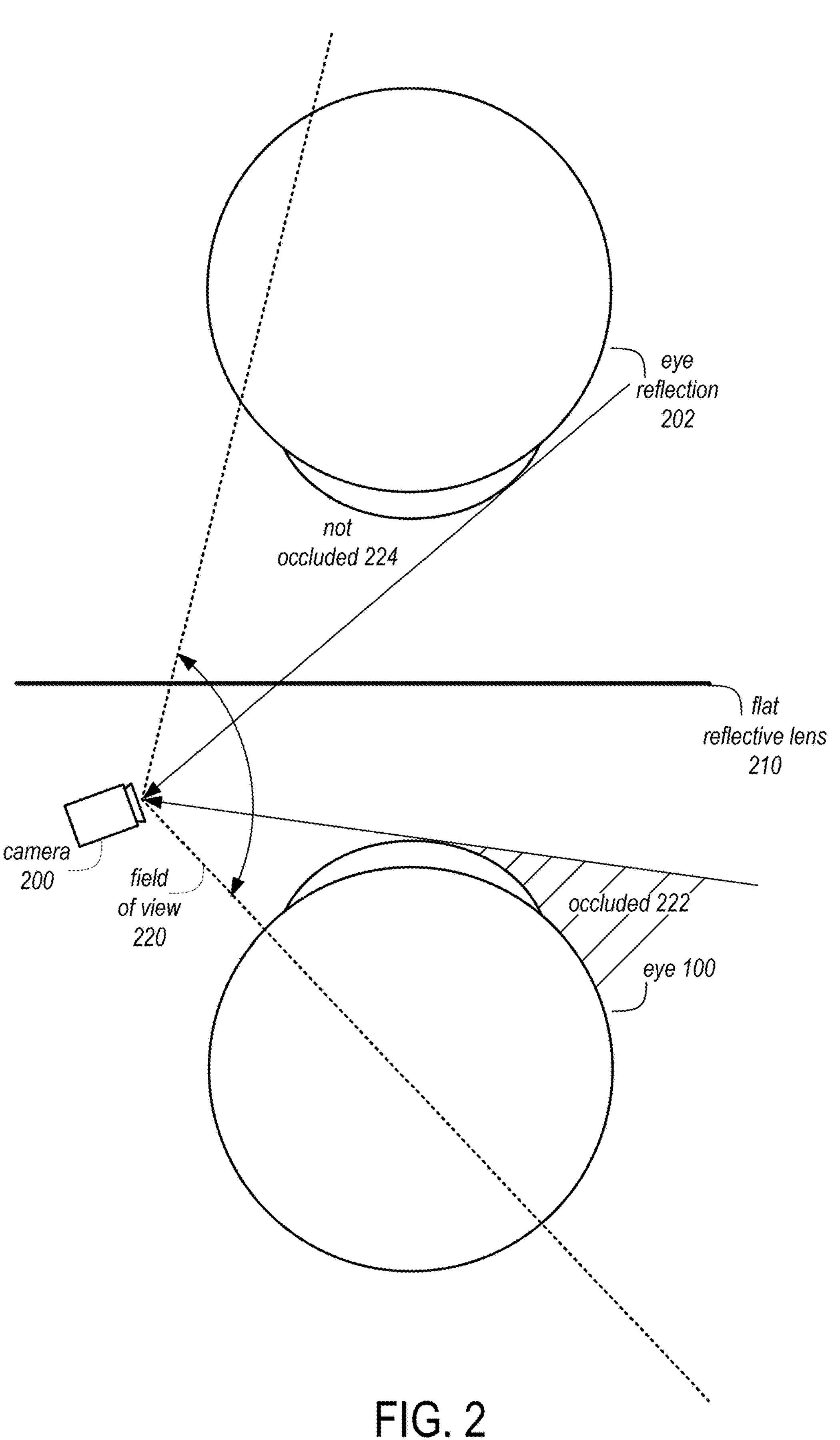
FIG. 2 illustrates a flat lens for capturing multiple eye views for gaze tracking, according to some embodiments.

FIG. 2 illustrates a flat lens for capturing multiple eye views for gaze tracking, according to some embodiments.

A flat reflective lens 210 may be implemented for a system that performs gaze tracking. In at least some embodiments, flat reflective lens 210 may be a hot mirror that reflects infrared or near infrared light, allowing for visible light or other non-visible light from other portions of the electromagnetic spectrum to pass through lens 210.

Camera 200 (which may be similar to camera 140 depicted in FIG. 1) may have a field of view 220 that captures a portion of the surface area of eye 100 as wells a portion of flat reflective lens 210, which may include a reflection 202 of eye 100. Additionally, in at least some embodiments, one or more other cameras may be used to capture portions of the surface of eye 100 and or a portion of flat reflective lens 210 to obtain at least two views of eye 100 using a single camera. For example, field of view 220 may, using a single image capture multiple views of an eye, where at least some portion of the eye is visible in the reflection (e.g., 202) that is not visible from the eye directly. As depicted in FIG. 2, not occluded portion 224 allows for a further width of eye reflection 202 to be captured than as shown by occluded portion 222.

Figure 3:
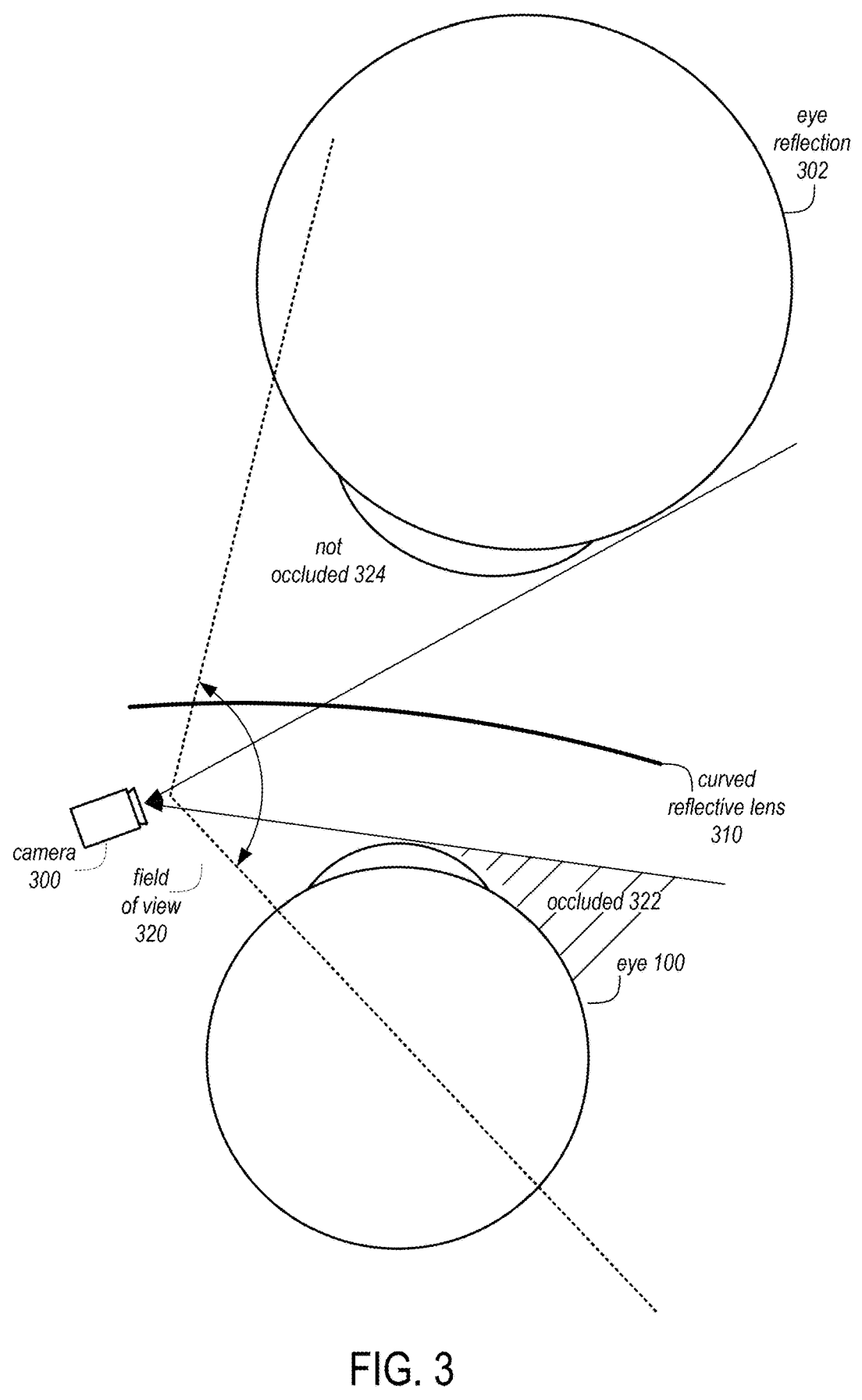

FIG. 3 illustrates a curved lens for capturing multiple eye views for gaze tracking, according to some embodiments.

A curved reflective lens 310 may be implemented for a system that is performing gaze tracking. In at least some embodiments, curved reflective lens 310 may be a hot mirror that reflects infrared or near infrared light, allowing for visible light or other non-visible light from other portions of the electromagnetic spectrum to pass through lens 310.

Camera 300 (which may be similar to camera 140 depicted in FIG. 1 and camera 200 depicted in FIG. 2) may have a field of view 320 that captures a portion of the surface area of eye 100 as well as portion of curved reflective lens 310, which may include a reflection 302 of eye 100. Additionally, in at least some embodiments, one or more other cameras may be used to capture portions of the surface of eye 100 and or a portion of curved reflective lens 310 to obtain at least two views of eye 100 using a single camera. For example, field of view 320 may, using a single image, capture multiple views of an eye, where at least some portion of the eye is visible in the reflection (e.g., 302) that is not visible from the eye directly. As depicted in FIG. 3, not occluded portion 324 allows for a further width of eye reflection 302 to be captured than as shown by occluded portion 322. The use of curved lenses may allow for obtaining different views and/or magnification of eye 100 (e.g., when compared with a flat lens as illustrated in FIG. 2).

Figure 4:
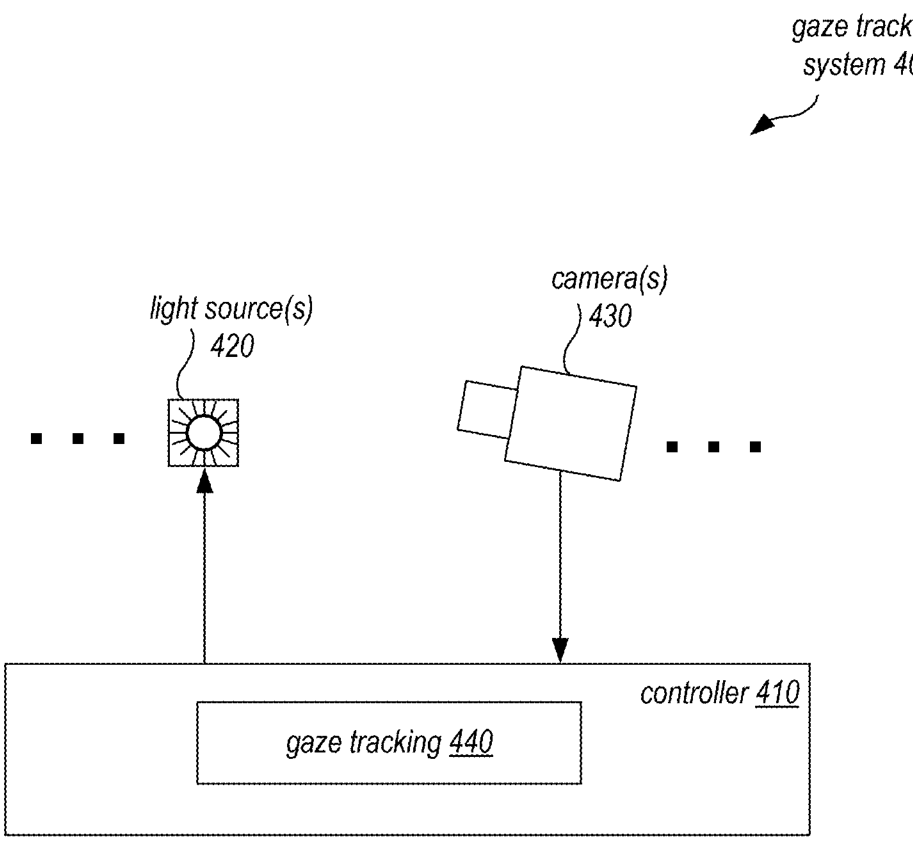
FIG. 4 illustrates a block diagram of an example gaze tracking system, according to some embodiments.

FIG. 4 illustrates a block diagram of an example gaze tracking system, according to some embodiments.

Gaze tracking system 400 may coordinate the performance of various gaze tracking techniques 440 by implementing controller 410 (e.g., similar to controller 150 in FIG. 1) to interact with one or more camera(s) 430 and one or more light source(s) 420. Camera(s) 430 may be similar to camera 140 in FIG. 1, camera 200 in FIG. 2, and/or camera 300 in FIG. 3. Likewise, light source(s) 420 may be similar to light source 130 in FIG. 1, light source 230 in FIG. 2, and light source 330 in FIG. 3. For example, controller 410 may coordinate the timing of light emissions from light source(s) 420 and image data capture from camera(s) 430. Gaze tracking system 400 may be implemented in many ways, including the use of a camera field of view capturing eye reflection and eye views for gaze tracking, as discussed in detail above with regard to FIGS. 1-3. For example, camera(s) 430 may be located so as to capture, at least a portion, of a surface of an eye and a portion of a surface of a reflective lens in order to capture image data that includes multiple views of an eye to increase the visibility of glints, for example, as part of performing gaze tracking techniques. Light source(s) 420 may be located different places in a gaze tracking system. For example, in one embodiment, light source(s) 420 may be located between surfaces (e.g., back and front) of a lens, in order to reflect multiple times and pass through to the surface of an eye according to a back surface transparency configuration (e.g., using partially transparent coatings and/or differently coated portions with full transparency and full reflectivity). In some embodiments, light source(s) 420 may be located in or as part of a frame of an apparatus that also includes a gaze tracking system, such as part of a head-mounted device, as discussed in detail below with regard to FIGS. 5A-5C.

Gaze tracking 440 may implement various techniques using image data captured from camera(s) 430 of a surface of one or multiple eyes. For example, in at least some embodiments, gaze tracking 440 may implement photometric stereo techniques that may include capturing images of an object at multiple lighting configurations and obtaining structure data, for example shadow information and shading information, from the images. Shadow information may include shadows that appear on a surface due to being blocked by a 3D structure. Information about the 3D structure may be determined with the position of the light relative to the camera. Shading information may include information about how light interacts with a surface, for example, the captured intensity and wavelengths of light relative to the emitted intensity and wavelengths of light. A gaze tracking technique may be implement to perform enrollment techniques which may make use a trained machine learning model, such as a convolutional neural network, to obtain structure data based on the captured imaged. For example, a gaze tracking enrollment technique may use a convolutional neural network to compare captured images at a same dilation state and pose to determine surface data, such as surface direction information which may include surface normals, of the eye, particularly of the cornea and iris-pupil boundary. The gaze tracking enrollment technique may use the surface data determined by the convolutional neural network to generate an iris-pupil edge model and a cornea model.

Gaze tracking 440 techniques, which may include the gaze tracking enrollment techniques, may use an iris-pupil edge model to determine the center of vision of an eye relative to the center of the pupil. A gaze tracking technique 440 may also use a cornea model to determine the location of the center of the pupil using glint tracking techniques and obtain information about the focus of the eye.

In some embodiments, gaze tracking 440 may use or direct camera(s) 430 to use an image captured by a camera that is a burst image. A burst image may be a set of images taken during a short time period. A burst image may include more information than a non-burst image. A burst image may be captured by exposing a light sensor of a camera for an exposure time, beginning at read time during which information captured during the exposure time is changed into retainable digital information, and carrying out an exposure separation time during which the light sensor of the camera is reset.

In such example techniques the read time may overlap with exposure separation time and part of a later exposure time. A camera may use integrate-while-read techniques to process a captured frame while another frame is being captured by beginning processing immediately after captured frame information is received and not stalling the camera during processing. An integrate-while-read technique may enable the camera to capture a burst image in a shorter amount of time.

In such example techniques, burst image captures may be timed to minimize the impact of eye motions, for example, saccadic motion, which is not controllable. Saccadic motion occurs at approximately 50 degrees per second. A gaze tracking enrollment technique may set a time during which a burst image is captured so that saccadic motion causes an amount of eye movement below a threshold, for example, one pixel of movement as captured by a camera at a known distance from the eye. A gaze tracking enrollment system may correct movement within a burst by comparing the portion of the burst image affected by blur to another portion of the burst image, for example, a frame that was captured before the frame affected by blur. For example, the gaze tracking enrollment system may determine the locations of particular reference features in one or more frames of the burst image that are not being correct, determine the same reference features in a frame that is being corrected, and align the reference features of the frame being corrected to the reference features of the one or more frames that are not being corrected.

In at least some embodiments, a gaze tracking enrollment technique may, prior to an image to be used for structure data information gathering being captured, calibrate a camera to focus on a region of interest of an eye. The region of interest may be defined by an anatomical region that the gaze tracking enrollment system is collecting structure data for, for example, the outer edge of the cornea or the outer edge of the pupil. The gaze tracking enrollment technique may calibrate the camera by capturing an image of the eye and identifying the location of the anatomical features of interest in the image. The gaze tracking enrollment system may then direct the camera system to only process image data in the region of interest. Region of interest calibration may enable processing of image data fast enough to use an integrate-while-read technique, and may decrease the time needed to capture a burst image.

In some embodiments, controller 410 may perform or interact with other components that initiate gaze tracking techniques. For example, a gaze tracking enrollment technique may be initiated, when controller 410 receives a request to initiate enrollment for gaze tracking. The gaze tracking enrollment technique may select an eye position, or eye pose, and a dilation state. The gaze tracking enrollment technique may display an indicator corresponding to the selected eye position. The gaze tracking enrollment technique may illuminate light sources with a light configuration corresponding to the selected dilation state. In embodiments using region of interest calibration for image capturing, the gaze tracking technique may capture a calibration image and determine use the calibration image to determine the region of interest immediately prior to capturing an image of the eye for enrollment. The gaze tracking enrollment technique may capture an image of the eye illuminated by the lighting configuration.

The gaze tracking enrollment technique may determine whether there are a number of captured images above the threshold number for the currently selected position and dilation state. If the gaze tracking enrollment system determines that the number of captured images for the position and dilation state is not above a threshold, the gaze tracking enrollment technique may select a different light configuration corresponding to the same dilation state and repeat one or more prior operations. The threshold used may be higher than one to enable the gaze tracking enrollment system to use photometric stereo techniques, in some embodiments.

If the gaze tracking enrollment technique determines that the number of captured images for the position and dilation state is above a threshold, then the gaze tracking enrollment technique may determine whether there are a number of imaged positions above the threshold number for the dilation state. If the gaze tracking enrollment technique determines the number of imaged positions for the dilation state is not above the threshold number, then the gaze tracking technique may select a new eye position. The gaze tracking enrollment system then repeat one or more prior operations. The threshold may be a different threshold number than other thresholds used in the process.

If the gaze tracking enrollment system technique the number of imaged positions for the dilation state is above the threshold number, then the gaze tracking enrollment technique may determine whether there are a number of imaged dilation states above the threshold number for the enrollment process. If the gaze tracking enrollment technique determines the number of imaged dilation states for the enrollment process is not above the threshold number, then the gaze tracking enrollment technique may select a new dilation state. The gaze tracking enrollment system may then repeat one or more prior operations. The threshold may be a different threshold number than other thresholds used in the process.

If the gaze tracking enrollment technique determines the number of imaged dilation states for the enrollment process is above the threshold number, then the gaze tracking enrollment technique may process captured images to determine structural information of the eye.

Figures 5A, 5B, 5C:
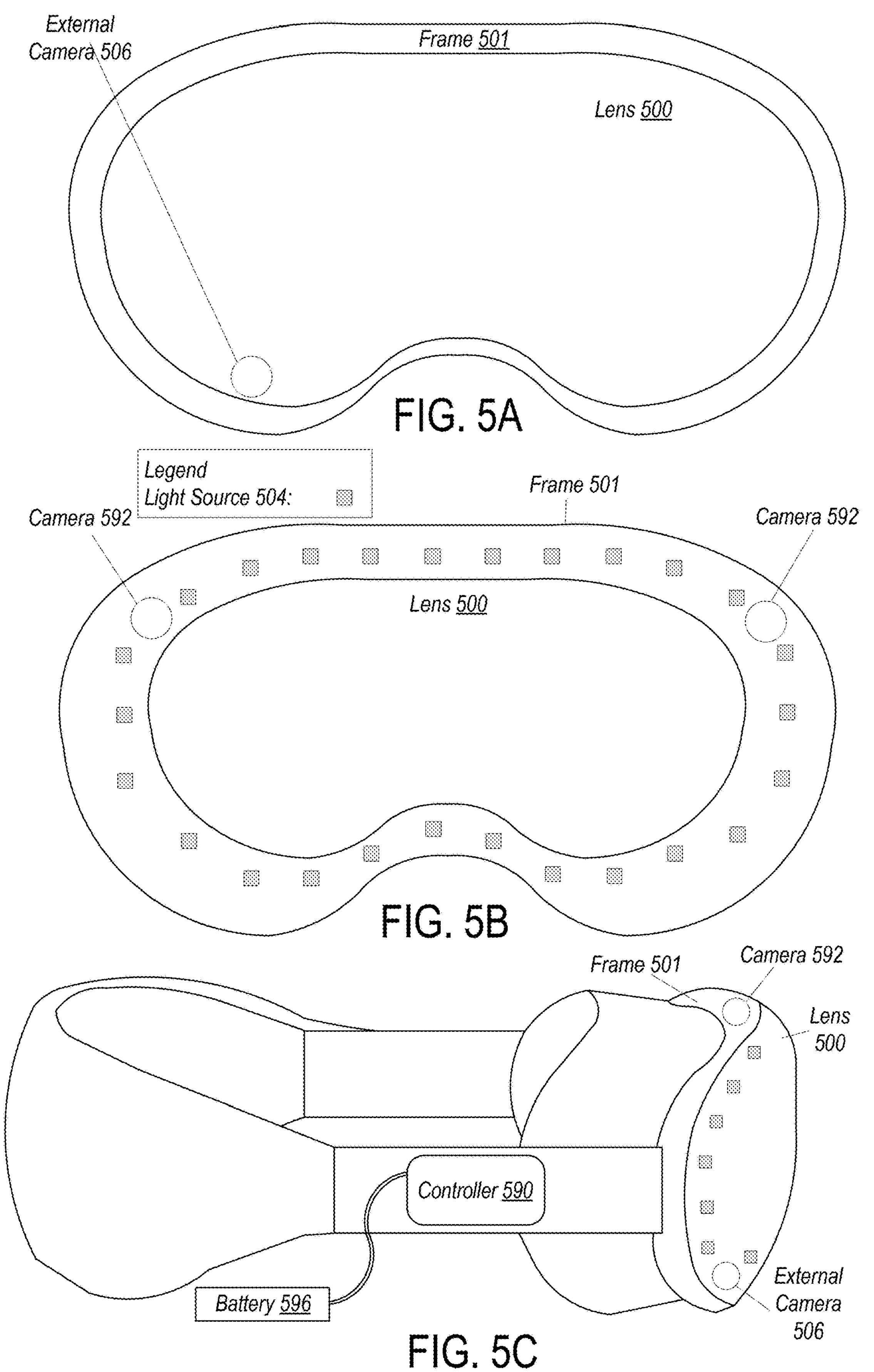
FIG. 5A is a front view of a headset-type head-mounted display device, according to some embodiments.
FIG. 5B is a back view of a headset-type head-mounted display device, according to some embodiments.
FIG. 5C is a side view of a headset-type head-mounted display device, according to some embodiments.

FIG. 5A is a front view of a headset-type head-mounted display device, according to some embodiments.

Various embodiments of light source image reflections for gaze tracking, as discussed above with regard to FIGS. 1-4, may be implemented in a head-mounted display device. A head-mounted display device may have a frame 601 similar to frames that are traditionally used for headsets and a single transparent lens 600. A head-mounted display device such as the device shown in FIGS. 5A-5C may be called a headset-type device. A headset-type device may include one or more external cameras 606. Light sources and the eye-directed camera that implement a gaze tracking techniques (including the gaze tracking enrollment techniques discussed above with regard to FIGS. 1-4) uses may not be visible from a front view of a headset-type device.

FIG. 5B is a back view of a headset-type head-mounted display device, according to some embodiments.

The back view of a headset-type device may be visible to a user of the device while the device is worn. A headset-type device may use one or more cameras 692 per eye which, as discussed in detail above with regard to FIGS. 1-4, may capture multiple views of an eye in a single image using a wide field-of-view, various orientations, or various types of specialty lenses, such as an anamorphic lens. Additionally, in some embodiments, although not illustrated, additional cameras 692 could be located in a top and/or bottom center of frame 601 to capture different field of views of different eyes than those captured by cameras 692 located in the top left and top right corners of frame 601. Such additional cameras may use the same techniques discussed above with regard to FIGS. 1-4. Light sources 604 may be limited to locations in the frame 601, and may not be located in the transparent lens 600.

FIG. 5C is a side view of a headset-type head-mounted display device, according to some embodiments.

A frame 601 of a headset-type device may include a support portion, which may enable the user to wear the headset-type device by surrounding the user's head. A controller 690 and a battery 606 may be located in a support portion of the frame 601, as shown in FIG. 5C. Controller 690 may be similar to controller 590 in FIG. 5, controller 410 in FIG. 4 and/or controller 150 in FIG. 1, in various embodiments. Light sources 604 may also be located in the support portion of the frame 601. Light sources may be set into the frame 601 as shown in FIG. 5C, or may extend out of the frame 601 towards the face of the user while the headset-type device is worn. In some embodiments, a portion of light sources 604 may be located between surfaces of lens 600, while other light sources 604 may be located in other components (e.g., set into the frame 601).

Other types of head-mounted display devices may implement various embodiments of light source image reflections for gaze tracking, as discussed above with regard to FIGS. 1-4. A head-mounted display device may be a glasses-type head-mounted display device which may have a frame similar to frames that are traditionally used for glasses and two separated transparent lenses, such as a first lens and a second lens. The first lens and the second lens may be similar to lenses, as discussed above with regard to FIGS. 1-4 and may include a reflective surface so as to allow a camera to capture a view of reflection of an eye in addition to a direct view of an eye in a same image. A head-mounted display device may be called a glasses-type device. A glasses-type device may include one or more external cameras. Light sources and the eye-directed camera that implement a gaze tracking techniques (including the gaze tracking enrollment techniques discussed above with regard to FIGS. 1-4) uses may not be visible from a front view of a glasses-type device.

The back view of a glasses-type device may be visible to a user of the device while the device is worn (although various components including light sources and/or cameras which may not be directly visible to a user of the device as they may be embedded in frame and/or emitting light between surfaces of first and second lenses as discussed above with regard to FIGS. 1-3). A glasses-type head-mounted display device may include one or more cameras per eye, which as discussed in detail above with regard to FIGS. 1-4 and may capture multiple views of an eye in a single image using a wide field-of-view, various orientations, or various types of specialty lenses, such as an anamorphic lens. Additionally, in some embodiments, further cameras could be located on outer sides of a frame to capture other views of eyes corresponding to a first lens and a second lens, which may use the same techniques discussed above with regard to FIGS. 1-4. In some embodiments, the glasses-type device may be partially rimless, for example, the frame may not completely surround the second lens and the first lens. In embodiments with partially rimless frames, the light sources may also not completely surround a second lens and a first lens and may instead be located on or near the frame.

A frame of a glasses-type device may include an arm, which may enable the user to wear the glasses-type device. A controller and a battery may be located in an arm portion of the frame. A controller may be similar to controller 410 in FIG. 4 and controller 150 in FIG. 1, in various embodiments. Light sources may also be located in the arm portion of the frame. Light sources may be set into the frame, or may extend out of the frame towards the face of the user while the glasses-type device is worn. In some embodiments, a portion of light sources may be located between surfaces of first and second lenses, while other light sources may be located in other components (e.g., the arm portion of the frame).

Figure 6:
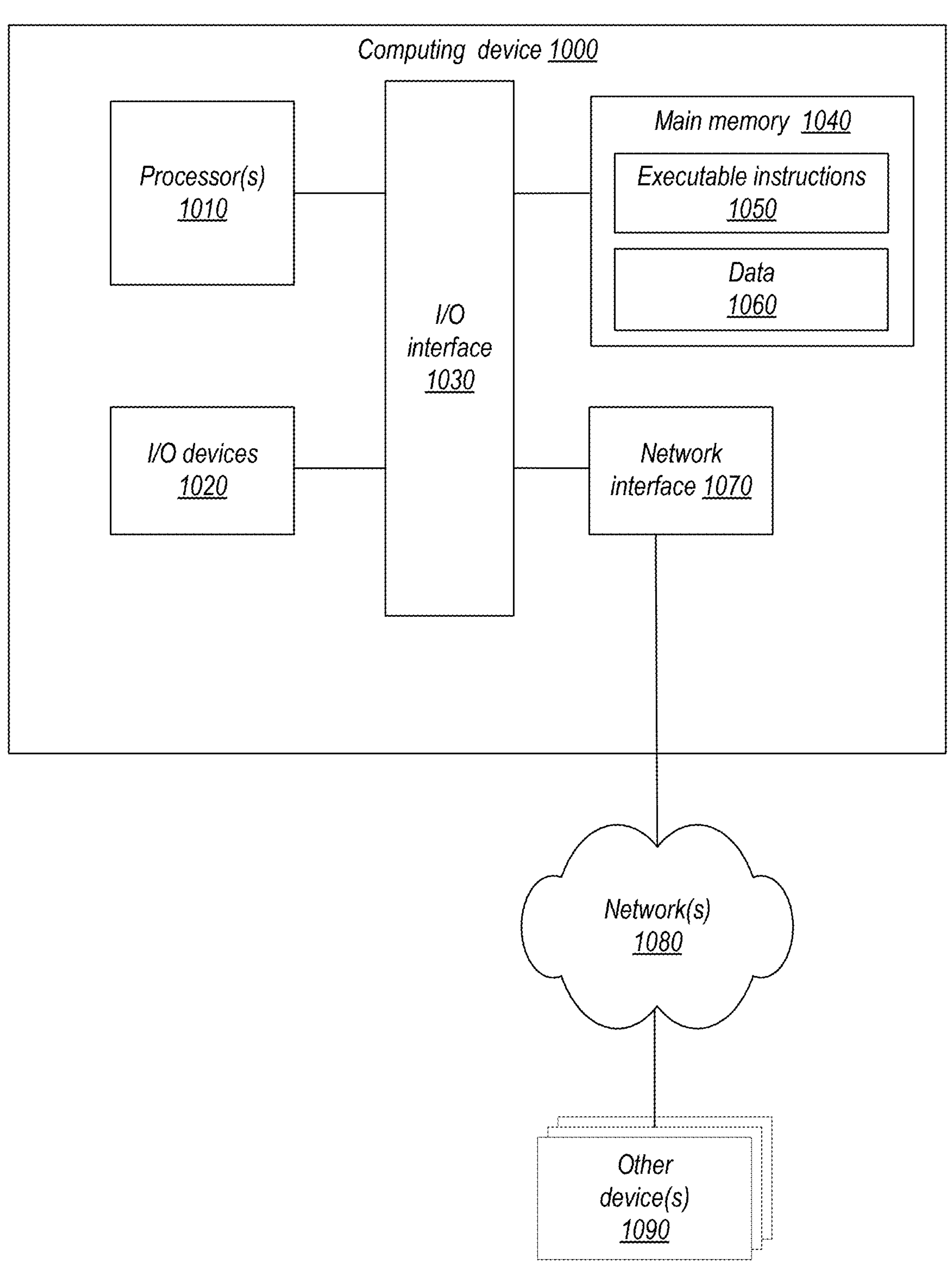
FIG. 6 is a block diagram illustrating an example computing device that may be used, according to some embodiments.

FIG. 6 is a block diagram illustrating an example computing device that may be used, according to some embodiments.

In at least some embodiments, a computing device that implements a portion or all of one or more of the techniques described herein may include a general-purpose computer system that includes or is configured to access one or more computer-accessible media. FIG. 6 illustrates such a general-purpose computing device 1000. In the illustrated embodiment, computing device 1000 includes one or more processors 1010 coupled to a main memory 1040 (which may comprise both non-volatile and volatile memory modules and may also be referred to as system memory) via an input/output (I/O) interface 1030. Computing device 1000 further includes a network interface 1070 coupled to I/O interface 1030, as well as additional I/O devices 1020 which may include sensors of various types.

In various embodiments, computing device 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some implementations, graphics processing units (GPUs) may be used instead of, or in addition to, conventional processors.

Memory 1040 may be configured to store instructions and data accessible by processor(s) 1010. In at least some embodiments, the memory 1040 may comprise both volatile and non-volatile portions; in other embodiments, only volatile memory may be used. In various embodiments, the volatile portion of system memory 1040 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 1050 and data 1060 implementing one or more desired functions, such as those methods, techniques, and data described above, are shown stored within main memory 1040.

In one embodiment, I/O interface 1030 may be configured to coordinate I/O traffic between processor 1010, main memory 1040, and various peripheral devices, including network interface 1070 or other peripheral interfaces such as various types of persistent and/or volatile storage devices, sensor devices, etc. In some embodiments, I/O interface 1030 may perform any necessary protocol, timing, or other data transformations to convert data signals from one component (e.g., main memory 1040) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to memory 1040, may be incorporated directly into processor 1010.

Network interface 1070 may be configured to allow data to be exchanged between computing device 1000 and other devices 1090 attached to a network or networks 1080, such as other computer systems or devices. In various embodiments, network interface 1070 may support communication via any suitable wired or wireless general data networks, such as types of Ethernet network, for example. Additionally, network interface 1070 may support communication via telecommunications/telephony networks such as analog voice networks or digital fiber communications networks, via storage area networks such as Fibre Channel SANs, or via any other suitable type of network and/or protocol.

In some embodiments, main memory 1040 may be one embodiment of a computer-accessible medium configured to store program instructions and data as described above for FIG. 1 through FIG. 5C for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computing device 1000 via I/O interface 1030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1000 as main memory 1040 or another type of memory. Further, a computer-accessible medium may include transmission media or signals such as electrical, electromagnetic, or digital signals, conveyed via a communication medium such as a network and/or a wireless link, such as may be implemented via network interface 1070. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

a controller;

a lens with a reflective surface;

a camera, with a field of view that includes at least a portion of a surface of an eye and at least a portion of the reflective surface of the lens that includes at least a portion of a reflection of the eye that is different, at least in part, from the portion of the surface of the eye;

one or more light sources, wherein the one or more light sources are configured to emit light that reaches the surface of the eye; and wherein the controller is configured to cause the camera to capture one or more images while the one or more light sources emit light to generate a composite view of the eye comprising different portions captured from the reflection and the surface of the eye.

2. The system of claim 1, wherein the light emitted from the one or more light sources is infrared light and wherein the reflective surface is a hot mirror.

3. The system of claim 1, wherein the camera comprises an anamorphic lens.

4. The system of claim 1, wherein the lens is curved.

5. The system of claim 1, wherein the controller is further configured to perform an eye enrollment technique for gaze tracking using the captured one or more images.

6. The system of claim 1, wherein the controller is further configured to perform a gaze tracking technique using the captured one or more images.

7. The system of claim 1, wherein the system further comprises a further camera, with a further field of view that includes at least a further portion of the surface of the eye and at least a further portion of the reflective surface of the lens that includes at least a further portion of the reflection of the eye; and wherein the controller is further configured to cause the further camera to capture a further one or more images while the one or more light sources emit light.

8. A head-mounted device, comprising:

a head-mountable frame, wherein the head-mounted frame comprises:

a controller;

a lens with a reflective surface;

a camera, with a field of view that includes at least a portion of a surface of an eye and at least a portion of the reflective surface of the lens that includes at least a portion of a reflection of the eye that is different, at least in part, from the portion of the surface of the eye;

one or more light sources, wherein the one or more light sources are configured to emit light that reaches the surface of the eye; and wherein the controller is configured to cause the camera to capture one or more images while the one or more light sources emit light to generate a composite view of the eye comprising different portions captured from the reflection and the surface of the eye.

9. The head-mounted device of claim 8, wherein the light emitted from the one or more light sources is infrared light and wherein the reflective surface is a hot mirror.

10. The head-mounted device of claim 8, wherein the camera comprises an anamorphic lens.

11. The head-mounted device of claim 8, wherein the lens is curved.

12. The head-mounted device of claim 8, wherein the controller is further configured to perform an eye enrollment technique for gaze tracking using the captured one or more images.

13. The head-mounted device of claim 8, wherein the head-mounted device, further comprises a further camera, with a further field of view that includes at least a further portion of the surface of the eye and at least a further portion of the reflective surface of the lens that includes at least a further portion of the reflection of the eye; and wherein the controller is further configured to cause the further camera to capture a further one or more images while the one or more light sources emit light.

14. The head-mounted device of claim 8, wherein the head-mounted device is a headset-type device.

15. The head-mounted device of claim 8, wherein the head-mounted device is a glasses-type device.

16. A gaze-tracking system, comprising:

a controller;

a lens with a reflective surface;

a camera, with a field of view that includes at least a portion of a surface of an eye and at least a portion of the reflective surface of the lens that includes at least a portion of a reflection of the eye that is different, at least in part, from the portion of the surface of the eye;

one or more light sources, wherein the one or more light sources are configured to emit light that reaches the surface of the eye; and wherein the controller is configured to:

cause the camera to capture one or more images while the one or more light sources emit light to generate a composite view of the eye comprising different portions from the reflection and the surface of the eye; and perform one or more gaze-tracking techniques using the captured one or more images of the eye.

17. The gaze-tracking system of claim 16, wherein the light emitted from the one or more light sources is infrared light and wherein the reflective surface is a hot mirror.

18. The gaze-tracking system of claim 16, wherein the camera comprises an anamorphic lens.

19. The gaze-tracking system of claim 16, wherein the lens is curved.

20. The gaze-tracking system of claim 16, wherein the gaze tracking system, further comprises a further camera, with a further field of view that includes at least a further portion of the surface of the eye and at least a further portion of the reflective surface of the lens that includes at least a further portion of the reflection of the eye;

wherein the controller is further configured to:

cause the further camera to capture a further one or more images while the one or more light sources emit light; and wherein the one or more gaze-tracking techniques is further performed using the further one or more images.

* * * * *